United States Patent

[11] 3,634,130

[72] Inventors Frank Long;
 Gordon R. Ensor, both of Llangollen, Wales
[21] Appl. No. 45,242
[22] Filed June 10, 1970
 Division of Ser. No. 701,103, Jan. 29, 1968, Patent No. 3,554,969
[45] Patented Jan. 11, 1972
[73] Assignee Monsanto Chemicals Limited
 London, England
[32] Priority Feb. 3, 1967
[33] Great Britain
[31] 5,362/67

[54] IMPREGNATES REINFORCING MATERIALS
 14 Claims, No Drawings
[52] U.S. Cl. .................................................. 117/121,
 117/126 GB, 117/126 AB, 117/126 GS, 117/132 B, 117/161 P, 117/76 T, 117/DIG. 11
[51] Int. Cl. ...................................................... B32b 17/04, B32b 19/02, B32b 19/08
[50] Field of Search ............................................ 117/126
 GB, 121, 161 P, 132 B, 126 AB, 126 GS, 76 T, DIG. 11

[56] References Cited
UNITED STATES PATENTS
3,179,634 4/1965 Edwards ........................ 260/78
3,349,061 10/1967 Pouckmayr .................. 260/47
3,413,267 11/1968 Kreuz ........................... 260/47

Primary Examiner—William D. Martin
Assistant Examiner—David Cohen
Attorneys—William J. Farrington, James C. Logomasini, Neal E. Willis and R. W. Sternberg ABSTRACT: Disclosed herein are fibrous reinforced resin composites especially adapted for high-temperature applications. The resin component is characterized by having a plurality of recurring imide linkages and direct linkages between aromatic nuclei. These materials are the polymeric reaction product of (1) a polycarboxylic anhydride having a molecular structure comprising at least two units (D) each derived by the loss of one or more hydrogen atoms from the nucleus of an aromatic carboxylic anhydride and at least one unit (E) derived by the loss of two or more hydrogen atoms from the nucleus or the nuclei of an aromatic compound containing one or more nuclei, and wherein any D unit is linked directly to one or more E units and any E unit is linked directly to at least two units selected from D units and E units, with (2) a polyamine containing two or more primary amino groups per molecule.

3,634,130

IMPREGNATES REINFORCING MATERIALS

CROSS-REFERENCES TO RELATED APPLICATIONS

This application, which claims the right of priority of British Pat. application No. 5362/67, filed Feb. 3, 1967, is a divisional application of copending application, U.S. Ser. No. 701,103, filed Jan. 29, 1968, and now U.S. Pat. No. 3,554,969.

BACKGROUND OF THE INVENTION

1. Field of the Invention

This invention relates to novel polymeric materials and to fibrous reinforced resin composites prepared therefrom. The polymeric materials used to prepare the composites are characterized by having a plurality of recurring imide linkages and direct linkages between aromatic nuclei. These materials are the polymeric reaction product of (1) a polycarboxylic anhydride having a molecular structure comprising at least two units (D) each derived by the loss of one or more hydrogen atoms from the nucleus of an aromatic carboxylic anhydride and at least one unit (E) derived by the loss of two or more hydrogen atoms from the nucleus or the nuclei of an aromatic compound containing one or more nuclei, and wherein any D unit is linked directly to one or more E unit and any E unit is linked directly to at least two units selected from D unit and E units; with (2) a polyamine containing two or more primary amino groups per molecule.

2. Description of the Prior Art

Polymeric Compositions containing a plurality of recurring imide linkages are well known in the art as is evidenced by U.S. Pat. Nos. 3,179,633, 3,179,634, 3,179,635, 3,190,856 and others. The polymers described in the foregoing references are characterized by having good thermal stability and other physical properties. However, the increasing demands of modern technology requires new polymeric materials with superior properties. A problem exists in the art in providing new polymeric materials with superior physical properties which will meet the requirements of modern technology.

SUMMARY OF THE INVENTION

This invention relates to novel polymeric materials characterized by having a plurality of recurring imide linkages and direct linkages between aromatic nuclei. These materials are the polymeric reaction product of (1) a polycarboxylic anhydride having a molecular structure comprising at least two units (D) each derived by the loss of one or more hydrogen atoms from the nucleus of an aromatic carboxylic anhydride and at least one unit (E) derived by the loss of two or more hydrogen atoms from the nucleus or the nuclei of an aromatic compound containing one or more nuclei, and wherein any D unit is linked directly to one or more E units and any E unit is linked directly to at least two units selected from D units and E units, with (2) a polyamine containing two or more primary amino groups per molecule.

This invention solves a problem of long standing in the art by providing polymeric materials with high thermal and oxidative stability which are suitable for use in the fabrication of articles that are required to withstand prolonged periods of service at high temperatures.

It is therefore an object of this invention to provide new polymeric materials having high thermal and oxidative stability.

It is another object of this invention to provide a process for the production of new polymeric materials having high thermal and oxidative stability.

The foregoing and other objects are obtained by the reaction of (1) a polycarboxylic anhydride having a molecular structure comprising at least two units (D) each derived by the loss of one or more hydrogen atoms from the nucleus of an aromatic carboxylic anhydride and at least one unit (E) derived by the loss of two or more hydrogen atoms from the nucleus or the nuclei of an aromatic compound containing one or more nuclei, and wherein any D-unit is linked directly to one or more E-units and any E-unit is linked directly to at least two units selected from D-units and E-units with (2) a polyamine containing two or more primary amino groups per molecule.

DESCRIPTION OF THE PREFERRED EMBODIMENTS

The polycarboxylic anhydrides for use as starting materials in the production of the polymers of the present invention are those described in British Pat. No. 1,155,542.

The polycarboxylic anhydride is usually one in which the unit D is derived by the loss of one or more hydrogen atoms from the nucleus of an aromatic carboxylic monoanhydride, for example phthalic anhydride, and the unit E is typically derived from benzene. Thus in one of the simplest instances, the polycarboxylic anhydride is terphenyl tetracarboxylic dianhydrides where two phthalic anhydride units are linked through a benzene nucleus.

Particularly useful as polycarboxylic anhydrides from which the polymers of the invention are derivable are mixtures of aromatic polyanhydrides wherein the individual anhydrides can be represented by the formula $D_xE_y$ where D represents a radical derived by the loss of one or more hydrogen atoms from the nucleus of the phthalic anhydride molecule, E represents a radical derived by the loss of two or more hydrogen atoms from the benzene molecule, and $x$ and $y$ are integers.

The overall ratio of D units to E units in the mixture can vary over a wide range, but generally the most useful are those in which the ratio of D units to E units is from 1:2 to 2:1 and more especially from 1:1 to 2:1.

In many of the individual anhydrides, $x$ has a value which is 1 greater than the value of $y$, and in general, individual anhydrides of this type range from those containing two D units to one E unit, i.e., terphenyl tetracarboxylic dianhydride, referred to above, to those containing eleven P units to 10 E units.

The simplest polycarboxylic anhydride may be represented by the following general formula:

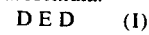  (I)

Some more complex polycarboxylic anhydrides may be represented by the following general formula:

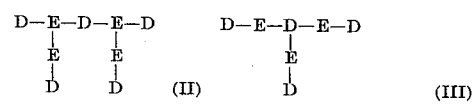

  (IV)

Mixtures of anhydrides represented by the foregoing formulas are especially useful.

Polycarboxylic anhydride starting materials used in the present invention are obtained by heating an aromatic polysulfonyl halide with an aromatic carboxylic anhydride under conditions such that sulfur dioxide and a hydrogen halide are evolved and direct linkages are formed between carbon atoms of the nucleus that was originally the nucleus of the aromatic polysulfonyl halide and carbon atoms of the nuclei that were originally carboxylic anhydride nuclei.

The aromatic sulfonyl halide used in the production of a polyanhydride are compounds containing one or more aromatic nuclei, and where it contains more than one nucleus, the sulfonyl halide groups are linked to carbon atoms of the same nucleus or to carbon atoms of different nuclei. A preferred class of polynuclear aromatic sulfonyl halides are those that contain from two to four aromatic nuclei arranged in a sequence, successive nuclei in the sequence being linked directly or through an intermediate atom or group, for example an oxygen or sulfur atom, or a carbonyl or sulfonyl group.

The nucleus or nuclei in the sulfonyl halide can be carbocyclic or heterocyclic, but carbocyclic nuclei, such as for instance benzene or naphthalene nuclei, are usually preferred. Useful properties are, however, also associated with nuclei having a heterocyclic ring fused to one or more carbocyclic rings, for example dibenzothiophen or dibenzofuran nuclei. Thus the sulfonyl halide can, for example, be a sulfonyl halide derivative of benzene; naphthalene; a polyaryl, especially a polyphenyl such as for instance biphenyl or terphenyl; an aryl ether, especially a phenyl ether, for example diphenyl ether or a bis(phenoxy)benzene; benzene; an aryl sulfide or sulfone, for example diphenyl sulfide, a dinaphthyl sulfide or diphenyl sulfone; dibenzothiophene; or of dibenzofuran.

The nucleus or nuclei of the aromatic sulfonyl halide can contain one or more substituents in addition to the sulfonyl halide groups. Such a substituent can be selected from a range of atoms or groups, including for instance halogen atoms, alkyl groups and alkoxy groups. In this respect, however, preferred polyanhydrides are those derived from unsubstituted aromatic sulfonyl halides or from aromatic sulfonyl halides having one or more fluorine or chlorine atoms as additional nuclear substituents.

The sulfonyl halides usually employed in practice are the sulfonyl chlorides although the sulfonyl bromides, for example, can also be used.

Specific examples of suitable aromatic sulfonyl halides are: benzene-1,3-disulfonyl chloride; benzene-1,3-disulfonyl bromide; 2,4,5,6-tetrachlorobenzene-1,3-disulfonyl chloride; naphthalene-1,5-disulfonyl chloride; naphthalene-2,7-disulfonyl chloride; naphthalene-1,3,6-trisulfonyl chloride; diphenyl-4,4'-disulfonyl chloride; diphenyl ether-4,4'-disulfonyl chloride; diphenyl sulfide-4,4'-disulfonyl chloride, dibenzothiophen-2,8-disulfonyl chloride and dibenzofuran-3,7-disulfonyl chloride.

The aromatic carboxylic intramolecular anhydride that is used in the production of a polyahydride can contain one or more anhydride groups, one or more aromatic nuclei, and, consistent with the requirement that nuclear hydrogen atoms should be present and that the anhydride should otherwise be inert with respect to the sulfonyl halide, one or more nuclear substituents. Such optional substituents include halogen atoms, for example, fluorine, chlorine or bromine.

The nucleus or each nucleus of the aromatic anhydride is generally carbocyclic, for instance a benzene or naphthalene nucleus, although desirable properties are also associated with nuclei having a heterocyclic ring fused to one or more carbocyclic rings, for example dibenzothiophen or dibenzofuran nuclei. Where more than one aromatic nucleus is present, these can be linked to each other directly or indirectly, for example through an oxygen or sulfur atom, or through an alkylene, carbonyl or sulfonyl group.

Aromatic anhydrides containing more than one anhydride grouping are preferably compounds that also contain more than one aromatic nucleus, such that only one anhydride grouping is associated with any one nucleus.

The preferred aromatic anhydride for use in the present invention is phthalic anhydride. Examples of others that can be used are the monochlorophthalic anhydrides; the phenylphthalic anhydrides; naphthalic anhydride; 3,3', 4,4'-biphenyl tetracarboxylic dianhydride; benzophenone 3,3', 4,4'-tetracarboxylic dianhydride; and diphenyl sulfone 3,3', 4,4'-tetracarboxylic dianhydride.

In the above process for the production of a polyanhydride starting material, it is usual to use a molar excess of the aromatic carboxylic anhydride, and preferably at least one mole of the anhydride per equivalent of the polysulfonyl halide (equivalent weight=molecular weight divided by the number of sulfonyl halide groups). It is sometimes advantageous to use a relatively large excess of the anhydride, for example up to 20 moles per mole of polysulfonyl halide. Unreacted anhydride is recovered from the reaction mixture after the evolution of sulfur dioxide and hydrogen halide is substantially complete. The reaction temperature in the production of the polycarboxylic anhydride usually lies within the range 200° to 350° C., although the reaction can proceed at temperatures outside these limits, for example from 175° to 200° C. or from 350° to 500° C. Where the boiling point of the aromatic carboxylic anhydride permits, it is usually most convenient to boil the reaction mixture under reflux at atmospheric pressure, thus giving, in the case of phthalic anhydride, reaction temperatures of from 275° to 320° C.

The ratio of benzene disulfonyl halide to phthalic anhydride employed in preparing the preferred polycarboxylic anhydride depends on the proportion of anhydride (D) units required in the product. It is found that under normal process conditions, i.e., operating at atmospheric pressure at temperatures in the range 200°–350° C., not all the phthalic anhydride is utilized, so that the ratio of phthalic anhydride to benzene disulfonyl halide in the reaction mixture should exceed the ratio of D units to E units required in the product. The exact ratio of reactants to be used to achieve a particular ratio of units in the product will depend on the particular reaction temperature and the presence or absence of a catalyst, but except for the production of a product consisting largely or exclusively of terphenyl dianhydrides it appears that generally the molar ratio of phthalic anhydride to benzene disulfonyl halide in the reaction mixture should be from approximately 1.5 to 5 times the ratio of corresponding units in the product. Within this range, the required excess increases as the ratio of D-units to E-units required in the product approaches 2:1. Where the required product consisting largely or exclusively of terphenyl tetracarboxylic dianhydrides, it is possible, and in fact advantageous, to use a large excess of phthalic anhydride, for example 10 or 20 moles of phthalic anhydride per mole of benzene disulfonyl halide.

The polymers of the present invention are obtained by the direct condensation of the anhydride reactant with the polyamine reactant, but alternatively a polymer-forming derivative of the anhydride, for example the corresponding acid or a partial ester and/or salt of the corresponding acid is used. These polymer-forming derivatives of the anhydride are well known to those skilled in the art. The polymers of the invention referred to above as having high thermal stabilities are polyimides, but the invention also includes polyamic acids formed by the condensation of the polyanhydride and the amine under mild reaction conditions. The polyamic acids are converted to polyimides on dehydration, and constitute a useful intermediate form of polyimide precursor.

The polyamine monomeric components used in the present invention are represented by the following general formula:

$$R(NH_2)_n \quad (I)$$

wherein R is an n-valent aromatic radical of from 2 to 52 carbon atoms.

The polyamines used in the practice of the present invention include diamines characterized by the formula:

$$R(NH_2)_2$$

wherein R is a divalent radical containing at least two carbon atoms selected from the following groups: aliphatic aromatic, cycloaliphatic, combination of aromatic and aliphatic, heterocyclic and bridged aromatic radicals wherein the bridging group is a divalent radical selected from the group consisting of alkylene of from one to six carbon atoms, oxygen, arylene of from 6 to 16 carbon atoms, —NH—, sulfur, sulfonyl, carbonyl, phosphorous, phosphonyl, silyl and derivatives thereof. The preferred R groups in the diamines are the aromatic amines containing at least one ring of six carbon atoms, characterized by benzenoid unsaturation. Such R groups include para-phenylene, meta-phenylene bisphenyl radicals, fused ring systems having two to four aromatic nuclei, wherein the two amine groups would be located on separate aromatic nuclei and bridged organic radicals of the general formula:

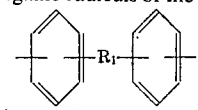

(II)

wherein $R_1$ is a divalent radical selected from the group consisting of an alkylene radical of from one to six carbon atoms, arylene radicals of from 6 to 16 carbon atoms, oxygen, —NH—, carbonyl, sulfonyl, phosphonyl and silyl radicals wherein the substituent groups on the phosphonyl and silyl radicals are aryl and alkaryl groups of from 6 to 16 carbon atoms, and those structures wherein the $R_1$ group is a divalent linking moiety joining the aromatic nuclei by ester, amide and thioester linkages.

Among the diamines which are suitable for use in the present invention are: meta-phenylene diamine; para-phenylene diamine; 4,4'-diamino-biphenyl 4,4'-diamino-diphenyl propane; 4,4'-diaminobenzophenone; 3,3'dichlorobiphenyl; 4,4'-diphenyl methane; benzidine; 4,4'-diamino-diphenyl sulfides; 4,4'diamino-diphenyl sulfone; 3,3'-diamino-diphenyl sulfone; 4,4'-diamino-diphenyl ether; 2,6-diamino-pyridine; bis-(4-amino-phenyl)diethyl silane; bis-(4-amino-phenyl)diphenyl silane; bis-(4-amino-phenyl)-N-methyl amine; 1,5-diamino naphthalene; 3,3'-dimethyl-4,4'-diamino-diphenyl; 3,3'-dimethoxy benzidine; 2,4-bis(beta-amino-t-butyl)toluene; bis-(para-beta-amino-t-butyl-phenyl)ether; para-bis (2-methyl-4-amino-pentyl)benzene; para-bis-(1,1-dimethyl-5-amino-pentyl)benzene; m-xylylene diamine; p-xylylene diamine; bis(para-amino-cyclohexyl-)methane; ethylenediamine, 1,3-propylenediamine; hexamethylene diamine; hepta-methylene diamine; octamethylene diamine; nonomethylene diamine; decamethylene diamine; 3-methyl-heptamethylene diamine; 4,4-dimethylheptamethylene diamine; 2,11-diamino-dodecane; 1,2-bis-(3-amino-propxy)ethane; 2,2-dimethyl propylene diamine; 3-methoxy-hexamethylene diamine; 2,5-dimethyl-hexamethylene diamine; 2,5-dimethyl-heptamethylene diamine; 5-methyl-nonamethylene diamine; 1,4-diamino-cyclohexane, 1,12-diamino-octadecane; 2,5-diamino-1,3,4-oxadizole; $H_2N(CH_2)_2O(CH_2)_3NH_2$; $H_2N(CH_2)_3 NH_2$; $H_2N(CH_2)_3N(CH_3)(CH_2)_3NH$; 3,3'-dichloro-benzidine; bis-(4-amino-phenyl)ethyl phosphine oxide; bis-(4-amino-phenyl)-phenyl phosphine oxide; bis-(4-amino-phenyl(N-phenylamine; p-phenylene-bis-2(amino-1,3-benzoxazole); 2,5-bis(p-amino phenyl)-1,3,4-oxadiazole; m-phenylene-bis-(m-aminobenzamide); 3,4'-diamino benzanilde and mixtures of the foregoing. Other useful polyamino compounds include melamine, 4,4'-thioaniline diphenyl ether, 4,4'-diaminotriphenylamine, 1,2,4-triaminobenzene, polymethylene polyanilines made by the reaction of aniline with formaldehyde which correspond to the following general formula:

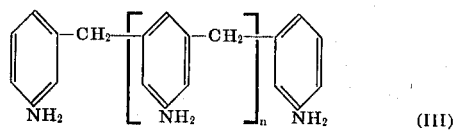

(III)

where ($n$) can vary from 0 to 3; the reaction products of diacyl halides with excess diamines which correspond to the following formula:

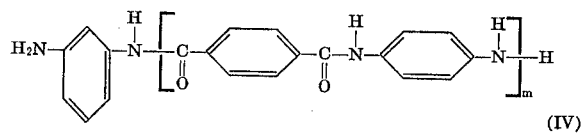

(IV)

where $m$ can be 1 to 4. Mixtures of these amines may be employed.

The polyamines illustrated in formula III are prepared by the reaction of aniline and formaldehyde as is well known to those skilled in the art.

The general procedure for preparing these compounds is to react at least two (2) moles of aniline with one (1) mole of formaldehyde in the presence of an equivalent amount of concentrated hydrochloric acid. The aniline and hydrochloric acid are charged to a reaction vessel and formaldehyde (50 percent) is added at temperatures in the range of 50°–90° C. The reactants are refluxed for about 1 hour at about 100° C., after which time the batch is cooled to at least 40° C. Equivalent amounts of sodium hydroxide are added to the batch. The layer containing the condensation product of the aniline and formaldehyde is then washed and steam distilled to remove any unreacted aniline.

Additional procedures for preparing these components may be found in U.S. Pat. Nos. 2,974,168 and 2,818,433.

The compounds represented by formula IV are prepared by methods generally well known to those skilled in the art. In one method, these compounds are prepared by reaction of an aromatic diacyl halide with excess amount of an aromatic diamine. For example, reaction of iso- or tere-phthaloyl chloride with an excess of diamines such as m- or p-phenylene diamine, methylenedianiline, etc., as is illustrated below:

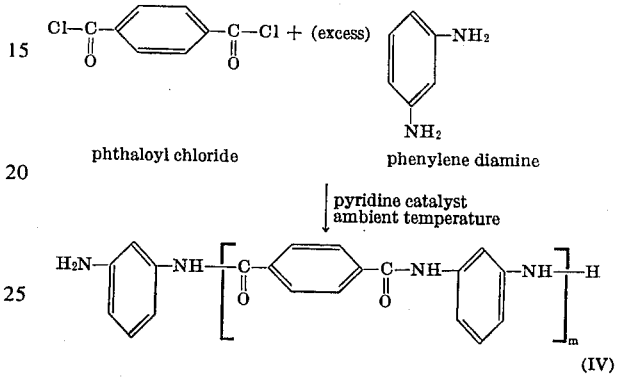

Another method involves the reaction of one mole of an aromatic diacyl halide with two moles of a monofunctional aromatic amine carrying a nitro-substituent, and subsequent reduction of the nitro groups, as is illustrated below:

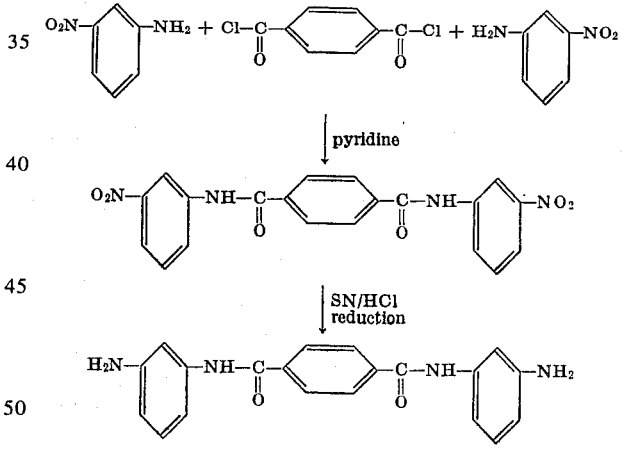

From the foregoing descriptions, those skilled in the art will readily recognize the methods and procedures used to prepare those compounds represented by formulas III and IV above.

In a diamine having the two amino groups on a single aromatic nucleus, such groups preferably occupy positions other than the ortho, and in diamines having more than one aromatic nuclei, the two amino groups are preferably located in different nuclei.

Although in the aromatic diamines normally employed the amino groups are the only nuclear substituents, there may be present one or more additional inert nuclear substituents, for example alkyl groups or halogen atoms.

The polymers of the present invention are obtained by the direct condensation of the polyanhydride and the polyamine. The proportions of monomers can vary from about 25 percent excess of the polyanhydride to about 25 percent excess of the polyamine. Preferred are equivalent amounts of polyanhydride and amine or amounts that are substantially so. The reaction between the polyanhydride and the polyamine is carried out in the molten state or in a solvent medium.

Preferred solvents are polar liquids such as for instance the N,N-di(lower alkyl) lower alkanolamides especially N,N-dimethylformamide and N,N-dimethylacetamide, N(lower alkyl)pyrrolidones, for example N-methylpyrrolidone, dimethyl sulfoxide, tetrahydrothiophene dioxide and hexamethylphosphoramide. Other solvents that can be used include lower alkyl alcohols of from one to eight carbon atoms such as methanol, ethanol, etc., glycols such as ethylene glycol, propylene glycol; aminoalcohols such as N,N'-diethyl amino propanol; halogenated hydrocarbons, for instance chloroform, perchloroethylene and chlorobenzene, and oxygen-containing solvents, for example dioxane; ketones such as acetone, methyl ethyl ketone; ethers and esters.

The first stage reaction product, especially when operating at a relatively low temperature, for instance between 20° and 60° C., is a polyamic acid. The conversion of this intermediate product to a thermally stable polyimide by the elimination of water between each amide grouping and its adjacent carboxylic acid grouping can be effected thermally or by the action of a chemical dehydrating agent. When heated alone, a temperature of at least 100° C., for example from 150° to 500° C. is generally required, temperatures in the range 200° to 400° C. being usual in practice. Dehydration can be effected at atmospheric pressure, but is advantageously conducted at reduced pressures. Chemical dehydrating agents that can be used include aliphatic acid anhydrides such as acetic anhydride, and carbodiimides. The solvent which may have been present during the formation of the polyamic acid will normally be removed before or during thermal dehydration, whereas chemical dehydrations requiring lower temperatures can often be conducted in the presence of the solvent.

In an alternative and preferred method for the production of the polymeric materials of the invention, the polyanhydride is first converted to a partial ester by reaction with a monohydric alcohol, generally one containing not more than 18, and preferably not more than six carbon atoms per molecule, for example methanol or ethanol, and the partial ester is then reacted with the amine. On subsequent heating, water and alcohol are eliminated to form imide linkages. The temperature required to effect this elimination is usually at least 100° C., for example from 150° to 500° C., and in practice temperatures of from 200°-400° C. are most often employed.

The polyimide polymers of the invention are valuable as binding agents for use with fillers in the production of surface coatings, or with fillers or reinforcing materials, especially fibrous reinforcing materials, in the production of articles having high mechanical strengths. Where advantage is taken of the high thermal stabilities of the polymers, and the coating or article is intended for exposure to high temperatures, the filler or reinforcing material used is one which is itself refractory, for example silica, alumina, titania, zirconia, silicon carbide, or various aluminosilicates in powder form; or fibers or filaments of asbestos, silica, carbon, graphite, aluminum silicate, boron, boron nitride, refrasil, quartz, silicon carbide or glass.

In the production of such an article or coating, at least the final stages of the process during which imide groupings are formed to the extent that the polymer becomes substantially insoluble and infusible, are carried out in the presence of the filler or reinforcing agent. The usual procedure involves the use of a solution of polymer-forming components, for example a mixture of the polyanhydride and polyamine, a mixture of a polyanhydride partial ester and polyamine, a polyamic acid, a partial ester-amine salt or a resin having a limited content of imide groupings consistent with its being soluble in the solvent. To obtain a high concentration of polymer-forming components in the solution it is sometimes advantageous to use a mixture of two or more of the various species. Suitable solvents include polar liquids such as N-alkyl-pyrrolidones especially N-methylpyrrolidone, N,N-dialkylcarboxamides, for instance N,N-dimethylformamide and N,N-dimethylacetamide, tetrahydrothiophene dioxide, dimethyl sulfoxide and hexamethylphosphoramide; and halogenated hydrocarbons, for example chloroform, perchloroethylene, and chlorobenzene.

The concentration of polymer-forming components in a solution for impregnation or coating is typically in the range 30-50 percent by weight of the solution. The optimum, however, varies with the method of coating or the absorbency of the material to be impregnated. For example, where the coating is applied by spraying, or relatively thick sections of material are to be impregnated, more dilute and less viscous solutions containing for instance from 5 to 30 percent by weight of polymer-forming components or less, may be appropriate. On the other hand, solutions containing higher concentrations, for instance up to 75 percent by weight of polymer-forming components can be used for coatings that are applied by dipping.

In the usual procedure for the production of an article of high mechanical strength containing a fibrous reinforcing agent, a mass of the fibrous material is impregnated with a solution of polymer-forming components, and, after removal of the solvent at a temperature depending on the volatility of the solvent, but usually up to 150° C., the composite body so obtained is subjected to an elevated temperature at which polyimide formation will occur or continue. Articles can be produced where the ratio of polyimide to reinforcing agent lies within a wide range; for example the reinforcing agent can constitute from 10 to 80 percent by weight of the composite, but preferably constitutes from 20 to 60 percent of this weight. For fibrous material of a given absorbency, this ratio is determined largely by the concentration of polymer-forming components in the impregnating solution, which is selected accordingly.

Preferred articles of high mechanical strengths have a laminated structure. Such a structure can be formed by subjecting to pressure at polymerization temperatures an assembly of several superimposed sheets or mats of impregnated fibrous material. Pressures of for example from 25 p.s.i. to 750 p.s.i. or higher, for example up to 5,000 p.s.i. and preferably from 50 to 600 p.s.i. can be used. The strengths of the laminates can often be further increased by the period of postcuring during which the laminate is stored, usually at ordinary pressures, at an elevated temperature. The temperature of storage can for example be from 200°-376° C. and the duration from for example 12 to 200 hours.

Surface coatings can be applied using a melt or solution of polymer-forming components, and then cured by heating at a temperature at which polyimide formation occurs. A composition for use as a surface coating may be a "varnish" consisting essentially of a solution of polymer-forming components in an organic solvent, or it can contain a filler in finely divided form. The filler can be one of those exemplified above, and typically has an average particle size in the range from 10 millimicrons to 50 microns. The amount of filler can vary from, for example, up to 80 percent of the combined weight of polymer-forming components and filler; preferably this percentage lies in the range 10 to 75. Coating compositions may also contain dehydrating agents as exemplified above.

In a preferred method of forming coatings, the surface, after the usual degreasing and cleaning, has applied to it one or two coatings of a "varnish" composition consisting essentially of a solution of polymer-forming components without filler. After drying, and optionally curing or partial curing, these are followed by one or more coatings of a filled composition. Drying temperatures are determined mainly by the volatility of the solvent employed. The coatings can be cured at temperatures in the range 200° to 400° C. The polyimides of the invention are of particular value for forming protective coatings on metal, especially ferrous metal, surfaces. The polymeric compositions of the present invention also find wide utility as molding powders, electric insulation films, fibers, and when foamed, as thermal insulation.

The invention is illustrated by the following examples.

EXAMPLE 1

This example is set forth to illustrate the preparation of a polyanhydride used as a starting material in the preparation of the polymers of the present invention using a molar ratio of sulfonyl halide/anhydride of 1/5 in the reaction mixture.

80 Grams (0.29 mole) of m-benzenedisulfonyl chloride are added to a stirred, refluxing mixture of 215 grams (1.45 moles) of phthalic anhydride and 0.055 gram of copper in an atmosphere of nitrogen. The phthalic anhydride/copper mixture is heated to boiling point in a reaction vessel equipped with a stirrer, reflux condenser, heated dropping funnel and an inlet for gas. A slow stream of nitrogen is led into the vessel above the surface of the liquid, and the m-benzenedisulfonyl chloride is added dropwise with stirring over a period of 6 hours 40 minutes, during which time the temperature rises from 284° to 298° C. Sulfur dioxide and hydrogen chloride are evolved and are led in the entraining stream of nitrogen into a scrubber containing sodium hydroxide solution. Analysis of the contents of the scrubber for chloride and sulfite at the end of the reaction showed that 97.3 percent of the theoretical amount of hydrogen chloride and 96.0 percent of the theoretical amount of sulfur dioxide has been evolved.

147 Grams of unreacted phthalic anhydride are recovered by distillation of the reaction mixture at a pressure of 25 mm. of mercury, leaving 87.5 grams of product. From the amount of phthalic anhydride recovered, it is calculated that the polyanhydride product contains 77.7 percent by weight of units derived from the phthalic anhydride. The polyanhydride is characterized by having a plurality of direct aromatic nuclei to aromatic nuclei linkages.

EXAMPLE 2

This example is set forth to illustrate the preparation of the polymeric products of the present invention.

The polymer is obtained by grinding a mixture of 10 grams of the polyanhydride (0.0525 mole of anhydride units) prepared in example 1 with 2.83 grams (0.026 mole) of p-phenylenediamine, to a fine powder and then transferring this ground mixture to a small flask fitted with a glass stirrer and thermometer. The mixture is heated and, after fusion, stirred. The mixture became progressively more viscous, and stirring is eventually discontinued. The temperature is taken to 300° C. for 30 minutes and the product is then allowed to cool. The polymeric product is a hard, insoluble, infusible resin, which contains a plurality of recurring imide linkages and direct aromatic nuclei linkages. This material has excellent oxidative thermal stability.

EXAMPLE 3

This example is set forth to illustrate the preparation of a six-ply laminate wherein the cured impregnating resin is characterized by having a plurality of recurring imide linkages and direct aromatic nuclei to aromatic nuclei linkages.

For the preparation of an asbestos-reinforced laminate, the half ester of the polyanhydride is first made by refluxing the polyanhydride for about 24 hours with an excess of anhydrous ethanol until solution is complete. An equivalent amount of p-phenylenediamine dissolved in ethanol is then added to the ester derivative and the resulting solution is used to impregnate six 6 inch by 4 inch asbestos felt mats. After draining and partial drying, these are laid one upon another and pressed for 3 minutes at 300 pounds per square inch and 120° C., and 30 minutes at 300 pounds per square inch and 320° C. After postcuring for 24 hours at 300° C. the laminate has high flexural strength and excellent thermal stability on aging in air at 300° C.

EXAMPLE 4

This example is set forth to illustrate the preparation of a polyanhydride having direct aromatic nuclei to aromatic nuclei linkages using a mole ratio of sulfonyl halide/anhydride of 1/12 in the reaction mixture.

The polyanhydride is obtained by a method essentially the same as that described in example 1 using 3,552 grams (24 moles) of phthalic anhydride (3,020 grams of which were recovered) and 550 grams (2 moles) of m-benzenedisulphonyl chloride in the presence of 12 grams of a copper powder catalyst. The polymeric product weighed 677 grams. From the amount of phthalic anhydride recovered, it is calculated that the product contains 78.6 percent by weight of phthalic anhydride units. By titration, the figure obtained for this proportion is 75.6 percent. A molecular weight determination in chloroform solution gives a value of 712.

EXAMPLE 5

This example is set forth here as another illustration of a multiply laminate wherein the cured impregnating resin is characterized by having a plurality of recurring imide linkages and direct aromatic nuclei to aromatic nuclei linkages.

1,500 cc. of dry ethanol containing 630 grams of the polyanhydride prepared in example 4 are boiled under reflux for 24 hours to give a solution of the half ester of the polyanhydride, to which is then added a solution in ethanol of the equivalent amount of m-phenylenediamine. Part of the resulting solution is used to impregnate six asbestos felts (12 inch × 12 inch) which are dried in air overnight and then for 2 hours at 50° C.

The felts are then placed one on top of another and pressed as follows: 15 minutes at 249 pounds per square inch and 120° C. and 5 hours at 311 pounds per square inch and 320° C. The laminate is postcured for 24 hours at 300° C. when the resin content is found to be 49 percent (weight/weight).

The laminate has high flexural strength and good aging properties at elevated temperatures.

EXAMPLE 6

This example describes the production of resins from a polyanhydride and a number of different diamines.

The polyanhydride used is obtained by a method essentially the same as that described in example 1, with 45.9 grams (0.167 mole) of m-benzenedisulfonyl chloride being added over a period of 7 hours 40 minutes to 296 grams (2.0 moles) of stirred molten phthalic anhydride containing 0.05 gram of copper in the form of fine wire at a temperature of 288°–296° C. 252 Grams of unreacted phthalic anhydride are recovered by distillation of the reaction mixture at a pressure of 25 mm. of mercury, leaving a product containing 78.25 percent by weight of units derived from the phthalic anhydride as calculated from the amount of phthalic anhydride recovered. A mixture of the polyanhydride and approximately twice its weight of dry ethanol is refluxed for 24 hours to give a solution of a partial ethyl ester of the polyanhydride. Portions of this solution are then treated as follows:

6 (A)

To one portion there is added an amount of p-phenylenediamine equivalent to the partial ester content of the solution. After mixing, the ethanol is evaporated under reduced pressure, and the residue is heated at 120° C. for 5 minutes, 320° C. for 3 hours and finally at 300° C. for 24 hours. The product after cooling is a hard, glassy resin.

6 (B)

An equivalent amount of meta-phenylenediamine is added to a second portion of the solution and the residue after evaporation of the ethanol is heated at 160° C. for 5 minutes, at 325° C. for 5 hours and finally at 350° C. for 16 hours. The product after cooling is a hard, glassy resin.

6 (C)

A resin is obtained from a further portion of the solution of the partial ethyl ester and using an equivalent amount of ethylenediamine using the same procedure as for p-phenylenediamine in part A above.

6 (D)

A resin is obtained from a further portion of the solution of the partial ethyl ester and an equivalent amount of 4,4'-diaminodiphenyl ether using the same procedure as for p-phenylenediamine in part A above.

Investigation of the thermal stabilities of the resins in the form of powder retained on a 120 mesh BSS sieve but passing a 40 mesh BSS sieve, in air at 400° C. using a Stanton Thermobalance, shows that the resins prepared using an aromatic diamine have excellent thermalstability while that resin prepared from ethylenediamine had expectedly lower thermal stability. The polyimides from m- and p-phenylenediamine lose weight less rapidly than that derived from 4,4'-diaminodiphenyl ether. The foregoing powders have utility as molding compositions.

EXAMPLE 7

This example describes the preparation of coating compositions and their use in coating metal surfaces wherein the cured coating compositions are characterized by having a plurality of recurring imide linkages and direct aromatic nuclei to aromatic nuclei linkages.

The polyanhydride starting material is obtained by a method essentially similar to that described in example 1 using a m-benzene disulfonyl chloride and phthalic anhydride in a molar ratio of 1:6 in the reaction mixture. Excess phthalic anhydride is recovered giving a product containing 73.05 percent by weight phthalic anhydride units and having an equivalent weight of 101.0.

Part of the polyanhydride is converted to a solution containing 33.5 percent (w/v) of the partial ethyl ester by refluxing with excess dry ethanol for 24 hours.

A solution is made having the following composition:
40 grams polyanhydride
32.5 cc. partial ester solution
13.4 grams p-phenylenediamine
350 cc. N-methylpyrrolidone The polyanhydride and the p-phenylenediamine are dissolved in separate portions of N-methylpyrrolidone, and the partial ester solution is added to the polyanhydride solution followed by the diamine solution.

Filled coating compositions are prepared by mixing portions of the above solution with an amount of filler equivalent to a percentage of the total solids content, i.e., polymer-forming components plus filler, as shown in the table below. The filler is incorporated by adding the solution slowly, with grinding, to the filler in a mortar.

The samples coated are mild steel (BSS 24) bars, 2×¾×¼ inches in size. These are treated before coating by boiling for 2 hours in chloroform, followed by pickling for 15–30 minutes in 12 percent aqueous hydrochloric acid containing 0.05 percent diphenylthiourea as an inhibitor. The bars are then washed and scrubbed with scouring powder, rinsed repeatedly with distilled water, then with a methylated spirits/acetone mixture, and are placed under chloroform until ready for use.

Coatings are formed by heating the bar and spraying it with the coating composition, the reservoir of which was shaken during spraying to maintain the filler in uniform suspension. Coating and cure conditions are shown in table I below. Any intermediate coating that is not cured or partially cured is allowed to dry for approximately 15 minutes at the application temperature before applying the next coating.

polyanhydride of example 1. The polyanhydride contains 75.5 percent by weight of phthalic anhydride units as determined by boiling a small sample of known weight for 30 minutes with an excess of N/10 sodium hydroxide solution and then back-titrating the solution against N/10 sulfuric acid.

A soluble ester of the polyanhydride is obtained by refluxing a mixture of the polyanhydride and dry ethanol with stirring under anhydrous conditions for 16 hours. Approximately 150 cc. of ethanol are used per 100 grams of polyanhydride. A solution for the impregnation of the fibrous reinforcing material is prepared by mixing the solution of the partial ester with a solution containing an equivalent weight of p-phenylenediamine in ethanol or chloroform and distilling off the solvent until the concentrate contains approximately 40 percent by weight of polymer-forming components.

Composites containing carbon fibers as the reinforcing agent are prepared by placing a weighed, 15-inch-long bundle of fibers in a trough and running the solution of polymer-forming components into the trough. After steeping, the fiber bundle is drained and dried at 50° C. for 16 hours. After this period, the 15 inches × ½ inches impregnate is cut into four 3.5-inch pieces, and these are weighed and aligned in the 3.5 inch long by ½ inch wide, by ½ inch deep well of a bar mold. The pressing plate of the mold is placed in position and the mold inserted between the hot platens of a press. Pressing is carried out in three stages, a warming up period with only touch pressure applied, a "prepress" for a relatively short period at low pressure, followed by a main pressing at high temperature and pressure. Details are given in table II below. The mold is removed from the press after cooling to 250° C. in air, and to 100° C. with water, keeping the pressure constant. Postcure is carried out by placing the composite in an air-circulating oven at 300° C. for 24 hours.

Other laminates are made using a cloth woven from fiber consisting essentially (98 percent by weight or above) of silica. Single 6 inch × 4 inch layers of the cloth are placed on stainless steel gauze and impregnated with the solution of polymer-forming components. The impregnated cloths are dried at up to 50° C. for 16 hours and a sandwich of 12 impregnated cloths is placed between aluminum foil (0.004 inch). This assembly is placed in the press and the pressing carried out in two stages, a "prepress" and a "main press" as shown in table II below. The press was then cooled by air to 250° C. and by water to 100° C., keeping the pressure constant, before removing the laminate which is finally postcured at 300° C. for 24 hours in an air-circulating oven.

A third type of laminate is made using a fibrous aluminosilicate analyzing approximately 50 percent weight Al$_2$O$_3$ and 50 percent by weight SiO$_2$ as the reinforcing agent. This was in the form of a felt or blanket of short, randomly oriented fibers. Pieces 6 inches × 4 inches in size are used. Because of the thickness of the felt, the solution of polymer-forming components is diluted before use to reduce its viscosity. The wet

TABLE I.—SUMMARY OF EXAMPLES 7(A) TO 7(C)

| Example | Filler | Percent filler of total solids | Total number of coats | Application temp (° C.) | Cure conditions |
|---|---|---|---|---|---|
| 7(A) | Silica, 30 mμ | 25 | 5 | 120–140 | 1½ hours at 300° C. |
| 7(B) | Silica, 8.8 μ | 50 | 6 | 100–120 | Every 2nd coat ½ hour at 300° C. Finally 1½ hours at 300° C. |
| 7(C) | Silicon carbide, 12μ | 50 | 6 | 100–120 | Do. |

The coatings are capable of withstanding prolonged exposure in air at elevated temperatures and show excellent resistance to corrosive environments.

EXAMPLE 8

This example further illustrates the use of polymers of the invention as binding agents for various fibrous materials in the production of laminates.

The polyanhydride used as starting material is obtained by heating benzene m-disulfonyl chloride:phthalic anhydride (mole ratio of 1:12) in the reaction mixture in a process essentially the same as that described for the production of the impregnates are dried at up to 50° C. for 17 hours. An assembly of 5 impregnates is then placed between aluminum foil (0.004 inch) and the pressing carried out in two stages as before. The laminate is removed from the press after cooling under constant pressure to 250° C. with air and to 100° C. with water and postcured at 300° C. for 24 hours.

A fourth type of laminate is made using glass cloth as the reinforcing agent. The glass cloth used is satin weave having weft and warp strengths of the same order of magnitude, made from "E" glass fiber containing less than 1 percent of alkali, surface treated with methacryloyloxypropyl trimethoxy silane. An impregnating composition is prepared by adding to the solution of the partial ester described above a solution of an equivalent amount of m-phenylenediamine in N-methyl-2-pyrrolidone and distilling off the solvent (largely the ethanol) until a concentrate containing approximately 40 percent by weight of polymer-forming components is obtained. Rectangles of cloth, 6 inches × 4 inches in size, are placed on stainless steel gauze and impregnated with the solution of polymer-forming components. The impregnated cloths are dried at 120° C. for 17 hours, and a sandwich of 12 cloths is then placed between two sheets of 0.004-inch-thick thick aluminum foil. This assembly is placed in a press, and the pressing carried out in two stages, a "prepress" and a "main press," as shown in the table below. The laminate is removed from the press after cooling in air to 250° C. under constant pressure, and further cooling to 100° C. with water. The laminate is postcured at 300° C. for 48 hours in an air-circulating oven. Further details are given in table II below.

Flexural strengths of the laminates are determined by cutting test pieces approximately 3.5 inches long by 0.5 inch wide from the laminate using a diamond-tipped circular saw. After measuring the dimensions of a test piece accurately, it was supported symmetrically across two parallel metal rods each 0.375 inch in diameter with axes 2 inches apart. A gradually increasing load is applied to the specimen through a third 0.375-inch diameter rod located parallel to, and equidistant and on the opposite side of the specimen from, the two supporting rods. The load required to break the specimen is measured and the flexural strength calculated from the formula:

Flexural strength (p.s.i.) = (1.5 × load × 2 /Width × (thickness)² where the load is expressed in pounds, 2 is the distance apart of the support rods in inches, and width and thickness are the width and thickness of the specimen in inches.

Table II follows below:

EXAMPLE 11

This example is set forth to illustrate the use of the polymers of the present invention as wire enamels. 64.5 Parts of a polyanhydride (comparable to that prepared in example 1 above); 15.2 parts of 2B ethanol and 377 parts of N-methyl pyrrolidone are added to a reaction flask. The temperature of the mixture is maintained between 50° to 60° C. with stirring for 8 hours and then cooled to about 25° C. 32.8 Parts of 4,4' methylene dianiline is then dissolved in the partial ester solution. The solution is then filtered and is used to coat No. 18 copper wire in a wire tower application using a maximum temperature zone of 400° C. The coated wire is found to have good thermal stability.

As stated above the polymeric compositions of the present invention can be used as electrical insulation, thermal insulation, surface coatings, impregnating resins, structural adhesives, free films, foams, molding powders, etc.

This present invention contemplates the use of additives or adjuncts commonly used with polymeric compositions such as stabilizers, fillers, extenders, adhesion promotors, blowing agents, foaming agents, etc.

In view of the foregoing it is obvious that many deviations may be made in the products or processes set forth above without departing from the scope of this invention.

What is claimed is:

1. A fibrous reinforced resin impregnated structure wherein the resin component is characterized by having a plurality of recurring imide linkages and direct aromatic nuclei to aromatic nuclei linkages, said resin comprising the polymeric reaction product of:

TABLE II.—SUMMARY OF LAMINATES PREPARED IN EXAMPLE 8

| | Pressing conditions | | | | | | Weight of laminate after pressing (grams) | Laminate properties after post-curing | | |
|---|---|---|---|---|---|---|---|---|---|---|
| | Pre-press | | | Main press | | | | | | |
| Reinforcing agent | Temp. (° C.) | Time (min.) | Press (p.s.i.) | Temp. (° C.) | Time (hrs.) | Press (p.s.i.) | | Percent resin | Thickness (in.) | Flexural strength (p.s.i.) |
| Carbon fibres | 320 | 2 | 57 | 320 | 3.133 | 342 | 3.58 | 47.25 | 0.1055 | 48,800 |
| Carbon fibres | 120 | 7 | 0 | 320 | 3 | 500 | 3.40 | 46.3 | 0.1055 | 45,650 |
| Silica cloth | 120 | 1 | 100 | 320 | 1 | 100 | 40 | 17.3 | 0.092 | 13,410 |
| Silica cloth | 100 | 0.5 | 25 | 320 | 1 | 100 | 57.5 | 36.85 | 0.111 | 19,300 |
| Silica cloth | 70 | 0.5 | 25 | 320 | 1 | 100 | 60.5 | 38.3 | 0.118 | 14,860 |
| Aluminosilicate felt | 120 | 2 | 300 | 320 | 0.05 followed by 1.0 | 300 935 | 85 | 47.7 | 0.137 | 15,670 |
| Aluminosilicate felt | 120 | 4 | 300 | 320 | 3 | 300 | 79 | 43.7 | 0.135 | 15,980 |
| Glass cloth | 350 | 5 | Contact | 350 | 0.5 | 250 | 98 | 42 | 0.103 | 48,400 |

EXAMPLE 9

A polyanhydride comparable to that of example 1 is prepared and converted to the partial ethyl ester according to the procedures set forth in example 8 above. The partial ester is mixed with an equivalent amount of 4,4'-methylene dianiline to give a 7 percent solids solution in N-methyl pyrrolidone. This solution is filmed out on an aluminum sheet and baked for 2 hours at 160° C.; 10 minutes at 200° C.; 10 minutes at 250° C. and 5 minutes at 300° C.

The resulting film, which has a thickness of about 5 mils has an excellent appearance and good thermal stability.

EXAMPLE 10

Example 9 is repeated here except that an equivalent amount of 4,4-oxydianiline is substituted for the diamine used in example 9. The resulting film has good thermal stability and better flexibility than the film of example 9.

A. a mixture of polycarboxylic anhydrides represented by the formula

$$D_x E_y$$

wherein D represents a radical derived by the loss of one or more hydrogen atoms from the nucleus of the phthalic anhydride molecule; E represents a radical derived by the loss of two or more hydrogen atoms from a benzene molecule; $x$ is an integer of from 2 to 11 and $y$ is an integer of from 1 to 10; wherein the link between any two aromatic nuclei is a single nuclear carbon to nuclear carbon bond; wherein the mixture of polycarboxylic anhydrides is prepared by heating a benzene disulfonyl halide with a molar excess of phthalic anhydride at temperatures in the range of from 200° to 350° C. such that sulfur dioxide and a hydrogen halide are evolved and direct linkages are formed between carbon atoms of the nuclei that were originally the nuclei of the benzene disulfonyl halide and carbon atoms of the nuclei that were originally phthalic anhydride nuclei; wherein the ratio of D units to E-units in the mixture of polycarboxylic anhydrides is from 1:2 to 2:1; and B. a diamine selected from the group consisting of m-phenylene diamine, p-phenylene diamine and diamine molecules which contain two benzene nuclei linked directly through a divalent radical selected from the group consisting of oxygen, sulfur, alkylene, haloalkylene, carbonyl and sulfonyl and wherein the alkylene groups contain from one to six carbon atoms.

2. A fibrous reinforced resin impregnated structure as in claim 1 wherein the diamine is selected from the group consisting of m-phenylene diamine, p-phenylene diamine, 4,4'-methylene dianiline and 4,4'-oxydi-aniline.

3. A fibrous reinforced resin impregnated structure as in claim 1 wherein the fibrous reinforcing element is carbon fibers.

4. A fibrous reinforced resin impregnated structure as in claim 1 wherein the fibrous reinforcing element is silica cloth.

5. A fibrous reinforced resin impregnated structure as in claim 1 wherein the fibrous reinforcing element is alumino-silicate felt.

6. A fibrous reinforced resin impregnated structure as in claim 1 wherein the fibrous reinforcing element is glass cloth.

7. Fibrous reinforcing elements impregnated with a polyimide forming composition, said polyimide forming composition comprising:

A. a polycarboxylic component comprising alkyl ester derivatives of a mixture of polycarboxylic anhydrides wherein the alcohol moiety of the ester contains from one to six carbon atoms; wherein the polycarboxylic anhydrides are represented by the formula $$D_xE_y$$

wherein D represents a radical derived by the loss of one or more hydrogen atoms from the nucleus of the phthalic anhydride molecule; E represents a radical derived by the loss of two or more hydrogen atoms from a benzene molecule; $x$ is an integer of from 2 to 11 and $y$ is an integer of from 1 to 10; wherein the link between any two aromatic nuclei is a single nuclear carbon to nuclear carbon bond; wherein the mixture of polycarboxylic anhydrides is prepared by heating a benzene disulfonyl halide with a molar excess of phthalic anhydride at temperatures in the range of from 200° to 350° C. such that sulfur dioxide and a hydrogen halide are evolved and direct linkages are formed between carbon atoms of the nuclei that were originally the nuclei of the benzene disulfonyl halide and carbon atoms of the nuclei that were originally phthalic anhydride nuclei; wherein the ratio of D-units to E-units in the mixture of polycarboxylic anhydride is from 1:2 to 2:1; and B. a diamine selected from the group consisting of m-phenylene diamine, p-phenylene diamine and diamine molecules which contain two benzene nuclei linked directly through a divalent radical selected from the group consisting of oxygen, sulfur, alkylene, haloalkylene, carbonyl and sulfonyl and wherein the alkylene groups contain from one to six carbon atoms.

8. Impregnated fibrous reinforcing elements as in claim 7 wherein the diamine is selected from the group consisting of m-phenylene diamine, p-phenylene diamine, 4,4'-methylene dianiline and 4,4'-oxydi-aniline.

9. Impregnated fibrous reinforcing elements as in claim 7 wherein the polycarboxylic component is an ethyl ester.

10. Impregnated fibrous reinforcing elements as in claim 7 wherein the fibrous reinforcing element is carbon fibers.

11. Impregnated fibrous reinforcing elements as in claim 7 wherein the fibrous reinforcing element is silica cloth.

12. Impregnated fibrous reinforcing elements as in claim 7 wherein the fibrous reinforcing element is alumino-silicate felt.

13. Impregnated fibrous reinforcing elements as in claim 7 wherein the fibrous reinforcing element is glass cloth.

14. Fibrous reinforcing elements impregnated with a polyamic acid capable of conversion to a polyimide resin characterized by having a plurality of recurring imide linkages and direct aromatic nuclei to aromatic nuclei linkages, said polyamic acid comprising the reaction product of:

A. a mixture of polycarboxylic anhydrides represented by the formula $$D_xE_y$$

wherein D represents a radical derived by the loss of one or more hydrogen atoms from the nucleus of the phthalic anhydride molecule; E represents a radical derived by the loss of two or more hydrogen atoms from a benzene molecule; $x$ is an integer of from 2 to 11 and $y$ is an integer of from 1 to 10; wherein the link between any two aromatic nuclei is a single nuclear carbon to nuclear carbon bond; wherein the mixture of polycarboxylic anhydrides is prepared by heating a benzene disulfonyl halide with a molar excess of phthalic anhydride at temperatures in the range of from 200° to 350° D units such that sulfur dioxide and a hydrogen halide are evolved and direct linkages are formed between carbon atoms of the nuclei that were originally the nuclei of the benzene disulfonyl halide and carbon atoms of the nuclei that were originally phthalic anhydride nuclei; wherein the radio of D-units to E units in the mixture of polycarboxylic anhydrides is from 1:2 to 2:1; and B. a diamine selected from the group consisting of m-phenylene diamine, p-phenylene diamine and diamine molecules which contain two benzene nuclei linked directly through a divalent radical selected from the group consisting of oxygen, sulfur, alkylene, haloalkylene, carbonyl and sulfonyl and wherein the alkylene groups contain from one to six carbon atoms.

* * * * *

PO-1050
(5/69)

UNITED STATES PATENT OFFICE
CERTIFICATE OF CORRECTION

Patent No. 3,634,130         Dated January 11, 1972

Inventor(s) FRANK LONG & GORDON R. ENSOR

It is certified that error appears in the above-identified patent and that said Letters Patent are hereby corrected as shown below:

Column 3, line 33, "polyahydride" should read --- polyanhydride ---.

Column 5, line 32 "$(CH_2)_3NH$" should read --- $(CH_2)_3NH_2$ ---.

Column 14, line 6, "377" should read --- 337 ---.

Signed and sealed this 27th day of June 1972.

SEAL)
.ttest:

DWARD M.FLETCHER, JR.        ROBERT GOTTSCHALK
.ttesting Officer             Commissioner of Patents